US012376167B2

(12) United States Patent
Kumar et al.

(10) Patent No.: US 12,376,167 B2
(45) Date of Patent: Jul. 29, 2025

(54) TECHNIQUES TO FACILITATE PRIORITIZING PACKET DATA CONVERGENCE PROTOCOL (PDCP) PROTOCOL DATA UNITS IN DUAL CONNECTIVITY

(71) Applicant: QUALCOMM Incorporated, San Diego, CA (US)

(72) Inventors: Ajeet Kumar, Hyderabad (IN); Sathish Kumar Nallamanti, Hyderabad (IN); Vishal Dalmiya, San Diego, CA (US); Vaishakh Rao, San Diego, CA (US); Krishna Chaitanya Bellam, Hyderabad (IN); Pankaj Mittal, Hyderabad (IN); Naga Yaswanth Kotha, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 434 days.

(21) Appl. No.: 17/652,475

(22) Filed: Feb. 24, 2022

(65) Prior Publication Data

US 2023/0269803 A1 Aug. 24, 2023

(51) Int. Cl.
| | |
|---|---|
| *H04W 76/15* | (2018.01) |
| *H04L 1/08* | (2006.01) |
| *H04W 28/06* | (2009.01) |
| *H04W 72/1273* | (2023.01) |
| *H04W 72/20* | (2023.01) |

(52) U.S. Cl.
CPC ............... *H04W 76/15* (2018.02); *H04L 1/08* (2013.01); *H04W 28/06* (2013.01); *H04W 72/1273* (2013.01); *H04W 72/20* (2023.01)

(58) Field of Classification Search
CPC .................................................. H04W 76/158
USPC ......................................................... 370/329
See application file for complete search history.

(56) References Cited

U.S. PATENT DOCUMENTS

| | | | |
|---|---|---|---|
| 2015/0131578 A1* | 5/2015 | Baek ...................... | H04B 7/024 370/329 |
| 2018/0368203 A1* | 12/2018 | Shi ........................ | H04L 5/0053 |
| 2022/0030464 A1* | 1/2022 | Kanamarlapudi ........................ | H04W 28/0933 |

* cited by examiner

*Primary Examiner* — Sibte H Bukhari
(74) *Attorney, Agent, or Firm* — Procopio, Cory, Hargreaves & Savitch LLP

(57) ABSTRACT

Apparatus, methods, and computer-readable media for facilitating prioritizing PDCP retransmission and/or control information in dual connectivity scenarios are disclosed herein. An example method for wireless communication at a first network node includes receiving PDUs for transmitting to a second network node while operating in a dual connectivity mode associated with a first RLC leg and at least a second RLC leg, the PDUs associated with at least one of control information or retransmission data. The example method also includes transmitting first scheduling information via the first RLC leg and transmitting second scheduling information via the second RLC leg based on the PDUs being associated with at least one of the control information or the retransmission data. The example first network node may include a UE or a base station.

20 Claims, 9 Drawing Sheets

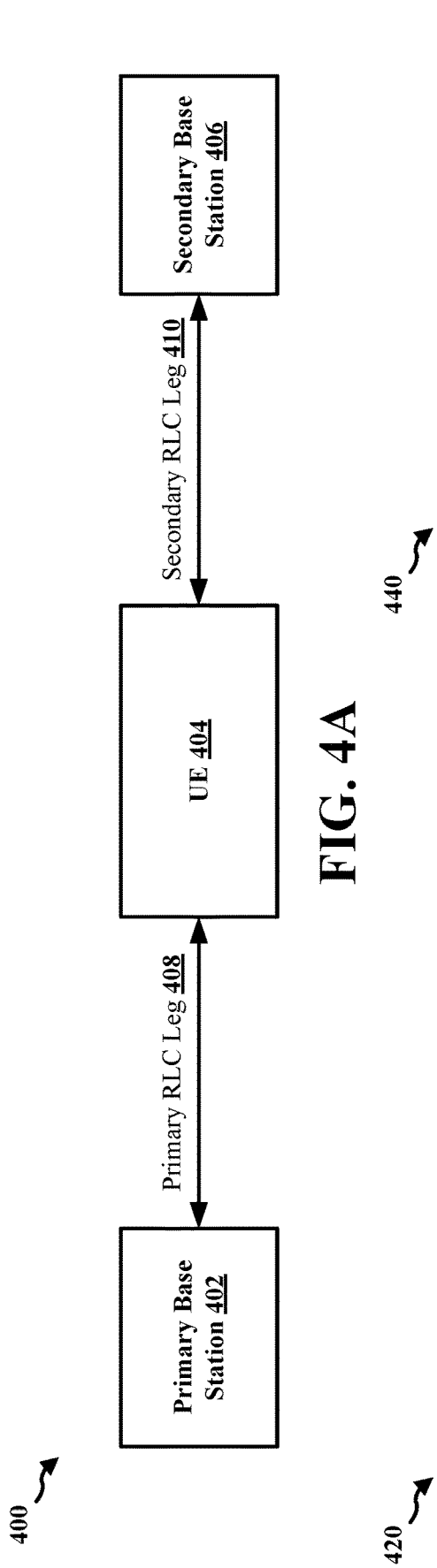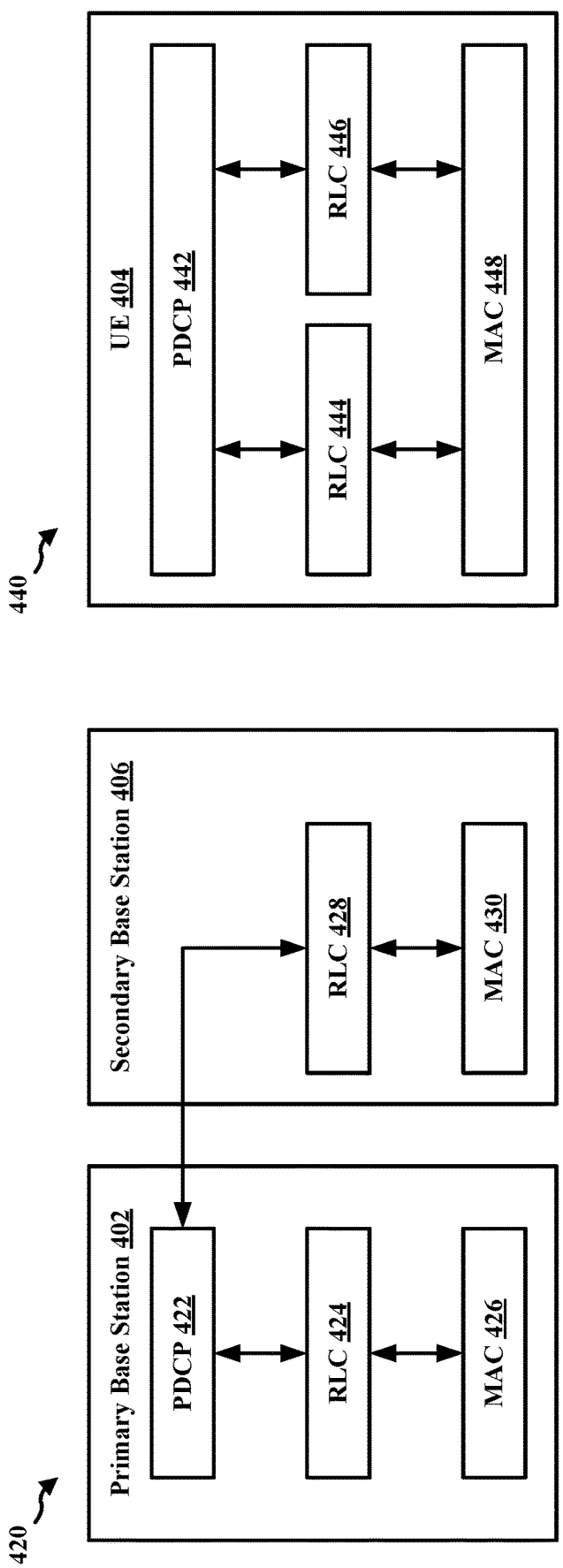

TECHNIQUES TO FACILITATE PRIORITIZING PACKET DATA CONVERGENCE PROTOCOL (PDCP) PROTOCOL DATA UNITS IN DUAL CONNECTIVITY

TECHNICAL FIELD

The present disclosure relates generally to communication systems, and more particularly, to wireless communication utilizing dual connectivity.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a first network node. An example apparatus receives protocol data units (PDUs) for transmitting to a second network node while operating in a dual connectivity mode associated with a first radio link control (RLC) leg and at least a second RLC leg, the PDUs associated with at least one of control information or retransmission data. The example apparatus also transmits first scheduling information via the first RLC leg and transmitting second scheduling information via the second RLC leg based on the PDUs being associated with at least one of the control information or the retransmission data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 4A illustrates an example environment 400 supporting dual connectivity, in accordance with the teachings disclosed herein.

FIG. 4B illustrates an example protocol stack 420 for dual connectivity at a network, in accordance with the teachings disclosed herein.

FIG. 4C illustrates an example protocol stack 440 for dual connectivity at a UE, in accordance with the teachings disclosed herein.

DETAILED DESCRIPTION

Figure 1:
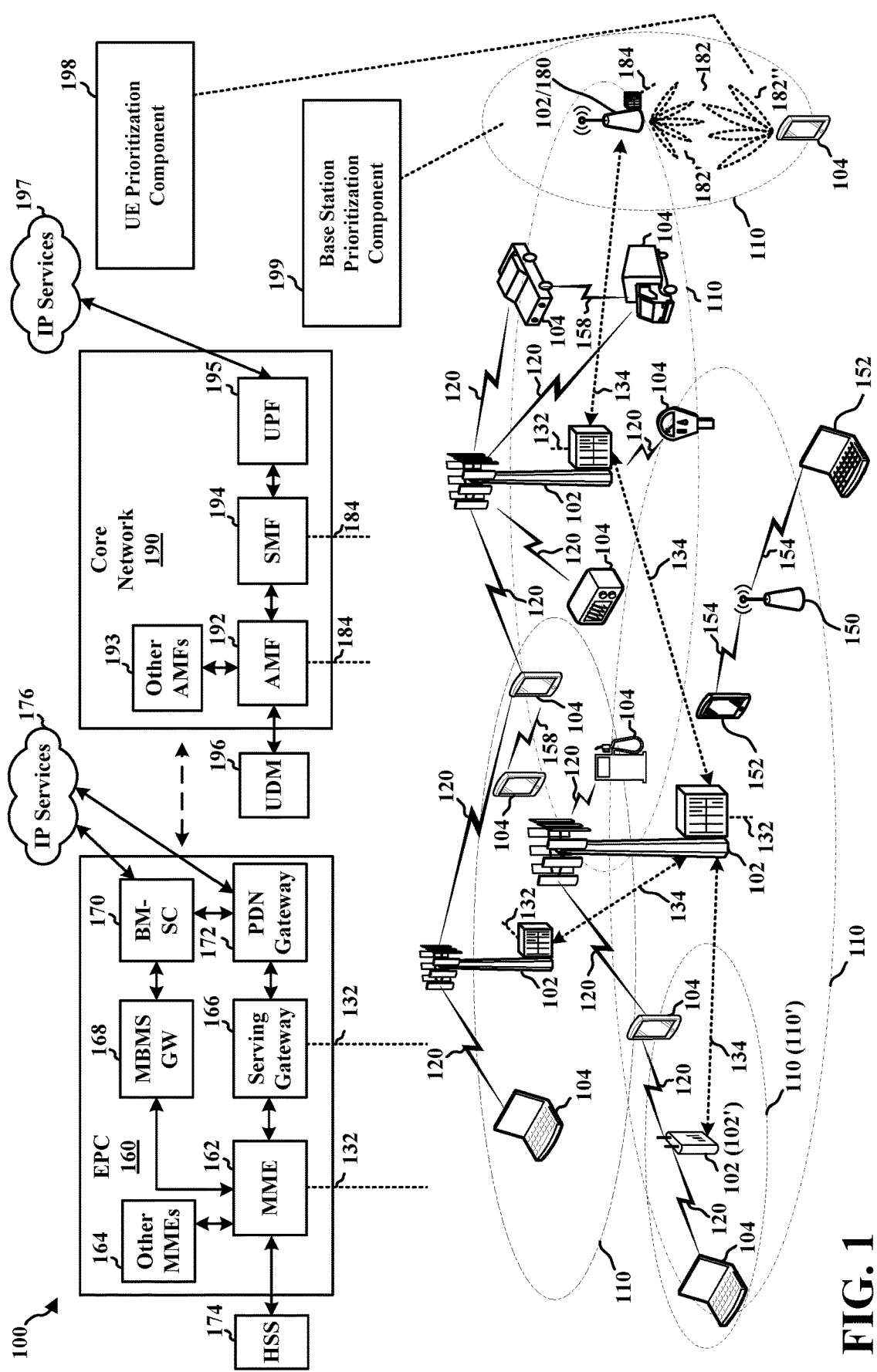
FIG. 1 is a diagram illustrating an example of a wireless communications system and an access network.

The aspects disclosed herein provide techniques for improved transmission at a PDCP entity. A PDCP entity of a transmitting device may receive data for transmitting to a PDCP entity of a receiving device. When the transmitting device and the receiving device are operating in a dual connectivity mode, they may establish a primary RLC leg with a primary RLC entity and one or more secondary RLC legs with one or more secondary RLC entities for transmitting the data from the transmitting device PDCP entity to the receiving device PDCP entity.

In some examples, the transmitting device PDCP entity may use a data split threshold volume to determine which RLC entity to use to transmit the data. For example, when the data to transmit is greater than or equal to the data split threshold volume, the transmitting device PDCP entity may transmit a scheduling request requesting a grant to transmit data on each of the RLC entities. However, when the data to transmit is less than the data split threshold volume, the transmitting device PDCP entity may transmit a scheduling request using the primary RLC entity and forego transmitting a scheduling request using the second RLC entity.

In some examples, however, the PDCP to be transmitted may be associated with higher priority transmissions. For example, the higher priority transmission may include control information, such as a status report, a robust header compression (ROHC) feedback, or Ethernet header compression (EHC) feedback. In some examples, the high priority data may include retransmission data. When the PDCP for transmission is associated with certain types of information, such as higher priority data, it may be beneficial to attempt to transmit the data to the receiving device PDCP entity with a best effort. In some aspects, the best effort may include attempting to transmit using more than the primary RLC leg. For example, a UE may transmit a scheduling request for the primary RLC leg and at least one secondary RLC leg, e.g., even if the volume is below a data split threshold volume.

Aspects disclosed herein provide techniques for transmitting high priority data from a transmitting device PDCP entity to a receiving device PDCP entity with a best effort to deliver the higher priority data while limiting delay of the data transmission. For example, when the transmitting device PDCP entity has control information or a PDCP retransmission to transmit, the transmitting device PDCP entity transmits a scheduling request on each of the RLC legs. When the data for transmitting is non-high priority data (e.g., does not include control information or PDCP retransmission), the transmitting device PDCP entity may transmit a scheduling request on each of the RLC legs when the data volume of the data for transmitting satisfies the data split threshold volume, or may transmit a scheduling request on the primary RLC leg when the data volume of the data for transmitting fails to satisfy the data split threshold volume.

The aspects presented herein may enable a transmitting device to transmit higher priority data, such as control information or a PDCP retransmission, with a best effort while operating in a dual connectivity mode, for example, by transmitting the higher priority data using whichever RLC leg that provides a grant first and irrespective of a relationship between the volume of the higher priority data and the data split threshold volume.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to nonmodular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100 including base stations 102 and 180 and UEs 104. In certain aspects, a device in communication with a base station, such as a UE 104, may be configured to manage one or more aspects of wireless communication by facilitating transmitting of PDUs while operating in a dual connectivity mode. For example, the UE 104 may include a UE prioritization component 198 configured to receive PDUs for transmitting to a second network node (e.g., the base stations 102 and 180) while operating in a dual connectivity mode associated with a first RLC leg and at least a second RLC leg, the PDUs associated with at least one of control information or retransmission data. The example UE prioritization component 198 may also be configured to transmit first scheduling information via the first RLC leg and transmitting second scheduling information via the second RLC leg based on the PDUs being associated with at least one of the control information or the retransmission data.

In another configuration, a base station, such as the base stations 102 and 180, may be configured to manage or more aspects of wireless communication by facilitating transmitting of PDUs while operating in a dual connectivity mode. For example, the base stations 102/180 may include a base station prioritization component 199 configured to receive PDUs for transmitting to a second network node (e.g., the UE 104) while operating in a dual connectivity mode associated with a first RLC leg and at least a second RLC leg, the PDUs associated with at least one of control information or retransmission data. The example base station prioritization component 199 may also be configured to transmit first scheduling information via the first RLC leg and transmitting second scheduling information via the second RLC leg based on the PDUs being associated with at least one of the control information or the retransmission data.

The aspects presented herein may enable a transmitting device to transmit high priority data with a best effort while operating in a dual connectivity mode, for example, by transmitting the high priority data using whichever RLC leg that provides a grant first and irrespective of a relationship between the volume of the high priority data and the data split threshold volume.

Although the following description provides examples directed to 5G NR (and, in particular, to transmissions while operating in a dual connectivity mode), the concepts described herein may be applicable to other similar areas, such as LTE, LTE-A, CDMA, GSM, and/or other wireless technologies, in which a network node may receive high priority data and non-high priority data for transmitting while operating in a dual connectivity mode.

The example of the wireless communications system of FIG. 1 (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management.

All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Figure 2:
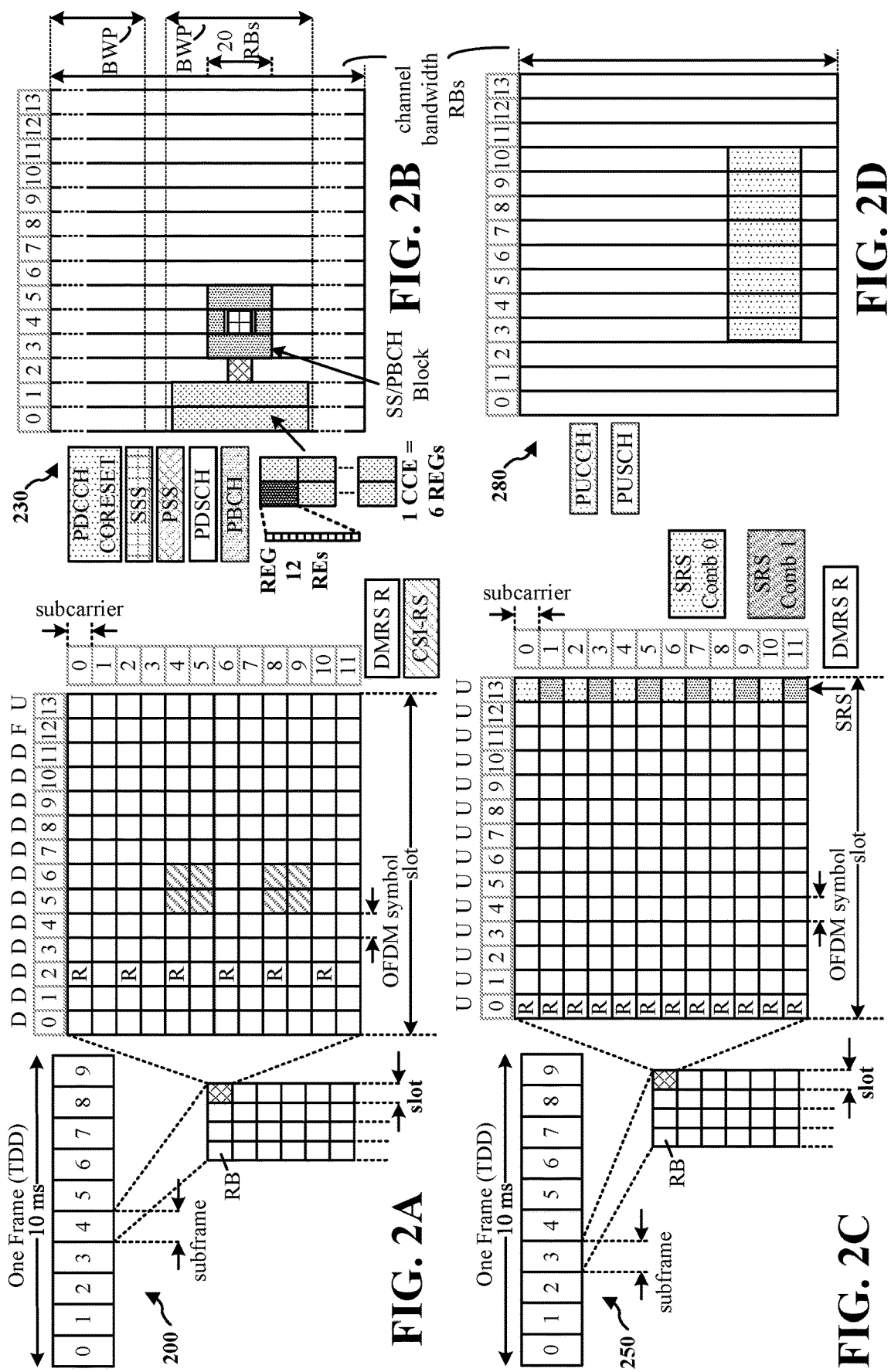
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
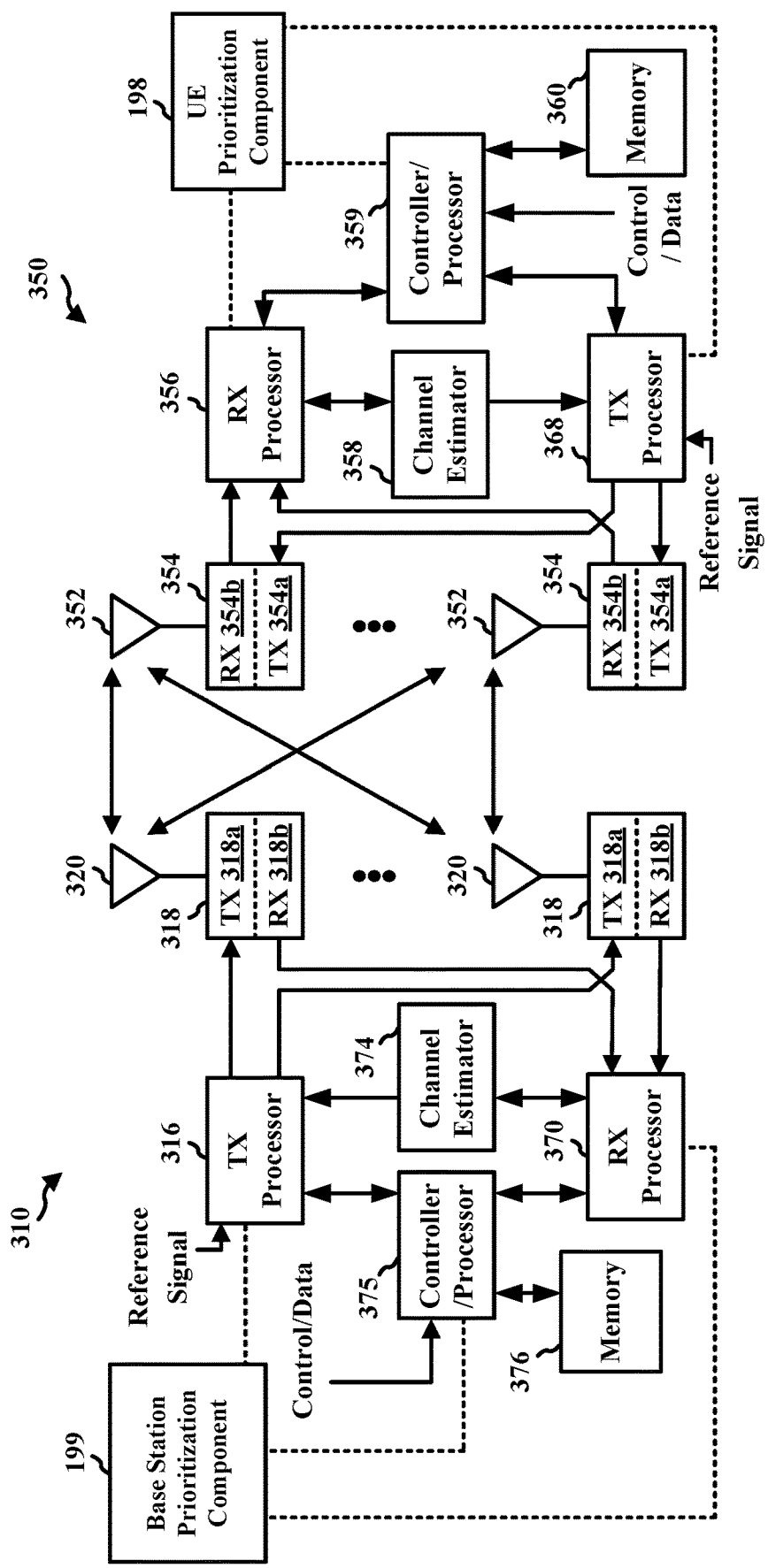
FIG. 3 is a diagram illustrating an example of a base station and a UE in an access network.

FIG. 3 is a block diagram that illustrates an example of a first wireless device that is configured to exchange wireless communication with a second wireless device. In the illustrated example, the first wireless device may include a base station 310, the second wireless device may include a UE 350, and the base station 310 may be in communication with the UE 350 in an access network. As shown in FIG. 3, the base station 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example UE 350 includes antennas 352, a transceiver 354 including a transmitter 354a and a receiver 354b, an RX processor 356, a channel estimator 358, a controller/processor 359, memory 360, and a TX processor 368. In other examples, the base station 310 and/or the UE 350 may include additional or alternative components.

In the DL, IP packets from the EPC 160 may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318a. Each transmitter 318a may modulate a radio frequency (RF) carrier with a respective spatial stream for transmission.

At the UE 350, each receiver 354b receives a signal through its respective antenna 352. Each receiver 354b recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The UL transmission is processed at the base station 310 in a manner similar to that described in connection with the receiver function at the UE 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UE prioritization component 198 of FIG. 1.

At least one of the TX processor 316, the RX processor 370, and the controller/processor 375 may be configured to perform aspects in connection with the base station prioritization component 199 of FIG. 1.

FIG. 4A illustrates an example environment 400 supporting dual connectivity, as presented herein. Dual connectivity allows a UE 404 to receive data simultaneously from and/or transmit data simultaneously to different base stations (e.g., a primary base station 402 and a secondary base station 406) in order to boost the performance of a communication link. The primary base station 402 and the secondary base station 406 may be connected via a backhaul interface.

FIG. 4B illustrates an example protocol stack 420 for dual connectivity at a network, as presented herein. In the example of FIG. 4B, the network is implemented by the primary base station 402 (sometimes referred to as a "master base station," a "primary cell group" or a "master cell group") and the secondary base station 406 of FIG. 4A. However, other examples may include any suitable quantity of base stations. Additionally, or alternatively, dual connectivity at the network may be implemented by a same base station providing different cells (e.g., a primary cell and one or more secondary cells). In the example of FIG. 4B, the protocol stack 420 may include a PDCP entity 422, a first RLC entity 424, and a first MAC entity 426 associated with the primary base station 402. The protocol stack 420 also includes a second RLC entity 428 and a second MAC entity 430 associated with the secondary base station 406. In dual connectivity, the PDCP entity 422 associated with the primary base station 402 may receive a packet from a higher entity or layer for transmitting to the UE 404. The PDCP entity 422 may transmit the packet via the first RLC entity 424 or the second RLC entity 428.

FIG. 4C illustrates an example protocol stack 440 for dual connectivity at a UE, as presented herein. In the example of FIG. 4C, the UE is implemented by the UE 404 of FIG. 4A. The protocol stack 440 includes a PDCP entity 442, a first RLC entity 444, a second RLC entity 446, and a MAC entity 448. In some examples, the protocol stack 440 may include any number of RLC entities (e.g., two, three, four, five, etc.). In the illustrated example, the MAC entity 448 may service more than one RLC entity. However, in other examples, the protocol stack 440 may include any suitable quantity of MAC entities to service the RLC entities.

In the examples of FIG. 4B and FIG. 4C, the PDCP entities provide multiplexing between different radio bearers and logical channels. The PDCP entities also provide header compression for upper layer data packets to reduce radio transmission overhead, security by ciphering the data packets, and handover support for UEs between base station. The RLC entities provide segmentation and reassembly of upper layer data packets, retransmission of lost data packets, and reordering of data packets to compensate for out-of-order reception due to hybrid automatic repeat request (HARQ). The MAC entities provide multiplexing between logical and transport channels. The MAC entities may also be responsible for allocating the various radio resources (e.g., resource blocks) in one cell among the UEs. The MAC entities may also be responsible for HARQ operations.

Referring again to the example of FIG. 4A, the UE 404 establishes dual connectivity with a network by establishing connections with the primary base station 402 and the secondary base station 406. In the illustrated example, the UE 404 may establish a first connection path (e.g., a primary RLC leg 408) with the primary base station 402. The UE 404 may also establish a second connection path (e.g., a secondary RLC leg 410) with the secondary base station 406. For example, the primary RLC leg 408 may correspond to a connection between the first RLC entity 444 of the UE 404 and the first RLC entity 424 of the primary base station 402. The secondary RLC leg 410 may correspond to a connection between the second RLC entity 446 of the UE 404 and the second RLC entity 428 of the secondary base station 406.

While operating in the dual connectivity mode, the UE 404 may use the primary RLC leg 408 and/or the secondary RLC leg 410 to transmit data. However, the UE 404 may be configured with an uplink data split threshold (e.g., which may be referred to as an "ul-DataSplitThreshold" parameter or by any other name) that may indicate when and how to split the data for transmitting. For example, the UE 404 may be configured with an uplink data split threshold of 100 bytes. In some examples, if the overall data volume for transmitting is less than the uplink data split threshold (e.g., less than 100 bytes), then the UE 404 transmits the data via the primary RLC leg 408. If the overall data volume is greater than or equal to the uplink data split threshold (e.g., greater than or equal to 100 bytes), then the secondary RLC leg 410 may also transmit a portion of the data.

However, in some examples, the RLC legs may experience different channel conditions. In such examples, if the channel conditions for each RLC leg are not considered when transmitting data, then the UE 404 may not take full advantage of the dual connectivity.

The aspects presented herein may enable a transmitting device to transmit certain types of information, such as higher priority transmissions, with a best effort while operating in a dual connectivity mode, for example, by transmitting the higher priority transmissions using whichever RLC leg that provides a grant first and irrespective of a relationship between the volume of the PDCP for transmission and the data split threshold volume. As examples of PDCP transmissions that may be considered high priority, the transmitting device may attempt to transmit with a best effort for PDCP retransmissions or control transmissions.

Figure 5:
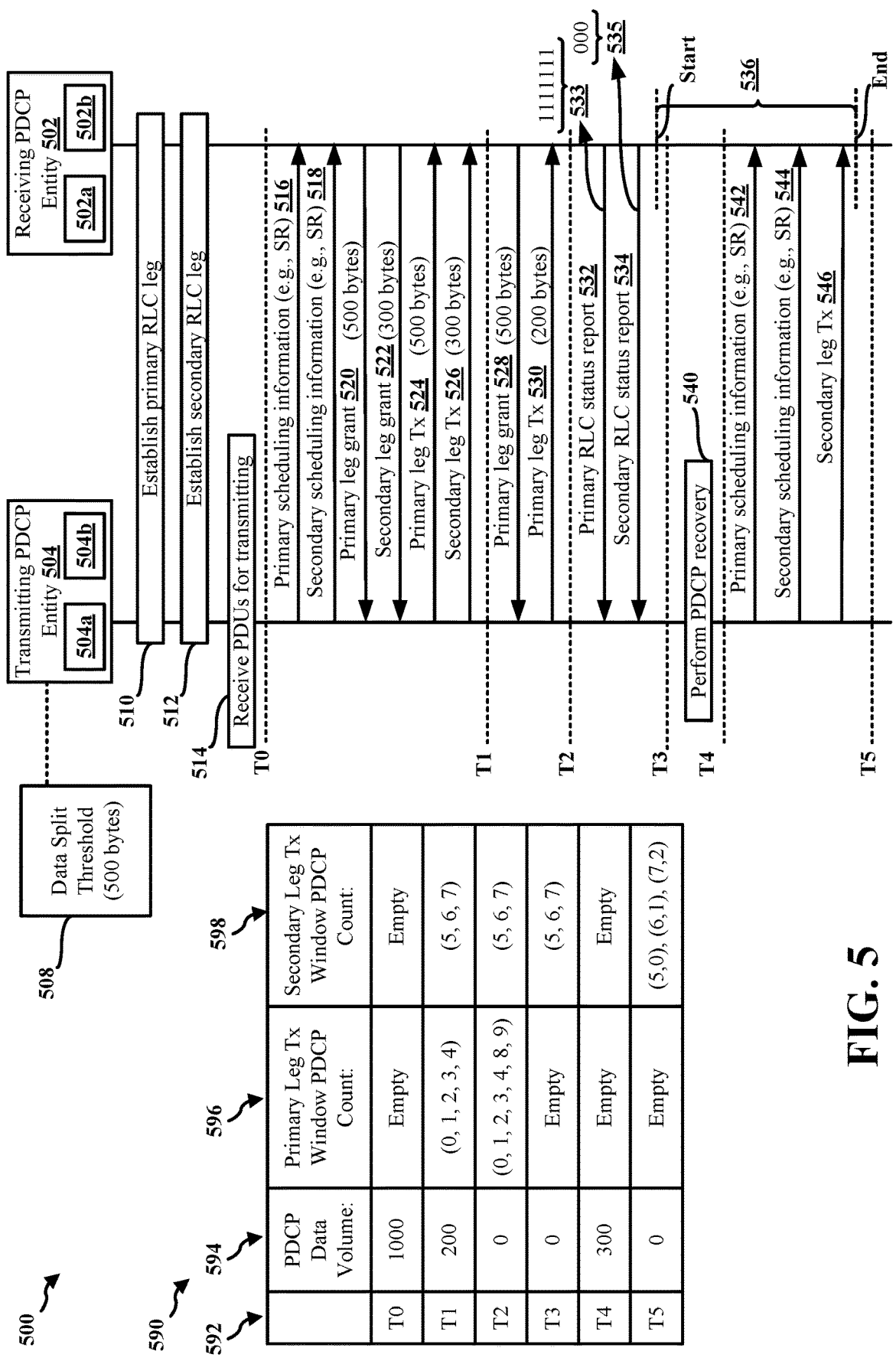
FIG. 5 is an example communication flow between a transmitting packet data convergence protocol (PDCP) entity and a receiving PDCP entity, in accordance with the teachings disclosed herein.

FIG. 5 illustrates an example communication flow 500 between a transmitting PDCP entity 504 and a receiving PDCP entity 502, as presented herein. In the illustrated example, the communication flow 500 facilitates the transmitting of high priority data while operating in dual connectivity with a best effort to deliver the high priority data with reduced delay. As described herein, high priority data may include retransmission data and/or control information. In some examples, the transmitting PDCP entity 504 may be part of a UE, such as the example UE 104 of FIG. 1 and/or the UE 350 of FIG. 3, and the receiving PDCP entity 502 may be part of a base station, such as the base station 102/180 of FIG. 1 and/or the base station 310 of FIG. 3. In other examples, the transmitting PDCP entity 504 may be part of a base station, such as the base station 102/180 of FIG. 1 and/or the base station 310 of FIG. 3, and the receiving PDCP entity 502 may be part of a UE, such as the example UE 104 of FIG. 1 and/or the UE 350 of FIG. 3. Although not shown in the illustrated example of FIG. 5, in additional or alternative examples, the transmitting PDCP entity 504 may be in communication with one or more other base stations or UEs, and/or the receiving PDCP entity 502 may be in communication with one or more other base stations or UEs.

As shown in FIG. 5, the transmitting PDCP entity 504 may be configured with a data split threshold volume 508. In the illustrated example of FIG. 5, the transmitting PDCP entity 504 is configured with a data split threshold volume 508 of 500 bytes. However, other examples may include any suitable data volume. Moreover, when the transmitting PDCP entity 504 is part of a UE, the data split threshold volume may correspond to an uplink data split threshold volume, which may be referred to as "ul-DataSplitThreshold" or by any other name. When the transmitting PDCP entity is part of a base station, the data split threshold volume may correspond to any conditional threshold volume associated with one or more of the RLC legs.

In the illustrated example of FIG. 5, the transmitting PDCP entity 504 is operating in a dual connectivity mode with the receiving PDCP entity 502. For example, the transmitting PDCP entity 504 includes a primary transmitting RLC entity 504a and a secondary transmitting RLC entity 504b, and the receiving PDCP entity 502 includes a primary receiving RLC entity 502a and a secondary receiving RLC entity 502b. As shown in FIG. 5, the transmitting PDCP entity 504 and the receiving PDCP entity 502 establish a primary RLC leg 510. For example, the primary transmitting RLC entity 504a and the primary receiving RLC entity 502a may establish a connection. Aspects of the primary RLC leg 510 may be implemented by the primary RLC leg 408 of FIG. 4A. The transmitting PDCP entity 504 and the receiving PDCP entity 502 may also establish a secondary RLC leg 512. For example, the secondary transmitting RLC entity 504b and the secondary receiving RLC entity 502b may establish a connection. Aspects of the secondary RLC leg 512 may be implemented by the secondary RLC leg 410 of FIG. 4A.

FIG. 5 includes a table 590 including a time column 592 indicating a time, and a data volume column 594 indicating a volume of data for transmitting at the transmitting PDCP entity 504 at a respective time. The example table 590 also includes a primary leg transmission window column 596 and a secondary leg transmission window column 598. The primary leg transmission window column 596 indicates a PDCP count of packets transmitted using the primary RLC leg 510 (e.g., transmitted from the primary transmitting RLC entity 504a to the primary receiving RLC entity 502a). The secondary leg transmission window column 598 indicates a PDCP count of packets transmitted using the secondary RLC leg 512 (e.g., transmitted from the secondary transmitting RLC entity 504b to the secondary receiving secondary receiving RLC entity 502b).

As shown in FIG. 5, the transmitting PDCP entity 504 receives, at 514, PDUs for transmitting to the receiving PDCP entity 502. The PDUs may include data packets and/or control packets. For example, the transmitting PDCP entity 504 may receive ten packets (e.g., packets 0 to 9) for transmitting, and each packet may be 100 bytes in size. As shown in the table 590, at a time T0, which corresponds to after the transmitting PDCP entity 504 receives the PDUs for transmitting, the transmitting PDCP entity 504 is scheduled to transmit 1000 bytes (e.g., the ten packets at 100 bytes each). Additionally, the PDCP count associated with the primary RLC leg 510 and the secondary RLC leg 512 are each empty.

After receiving the PDUs for transmitting (e.g., at 514), the transmitting PDCP entity 504 transmits scheduling information that is received by the receiving PDCP entity 502. The scheduling information may facilitate transmitting the PDUs to the receiving PDCP entity 502 via a respective RLC leg. For example, the transmitting PDCP entity 504 may transmit primary scheduling information 516 that is received by the receiving PDCP entity 502 to transmit packets via the primary RLC leg 510. The transmitting PDCP entity 504 may also transmit secondary scheduling information 518 that is received by the receiving PDCP entity 502 to transmit packets via the secondary RLC leg 512. The transmitting PDCP entity 504 may transmit the primary scheduling information 516 and the secondary scheduling information 518 via the primary RLC leg 510 and/or the secondary RLC leg 512.

As described above, the transmitting PDCP entity 504 may be part of a UE or may be part of a base station. In examples in which the transmitting PDCP entity 504 is part of a UE, the scheduling information may correspond to scheduling requests requesting an uplink grant from the receiving PDCP entity 502. For example, the primary scheduling information 516 may include a scheduling request requesting an uplink scheduling grant to transmit packets to the receiving PDCP entity 502 via the primary RLC leg 510, and the secondary scheduling information 518 may include a scheduling request requesting an uplink scheduling grant to transmit packets to the receiving PDCP entity 502 via the secondary RLC leg 512. In some examples, the primary scheduling information 516 and the secondary scheduling information 518 may include the total data volume for transmitting. For example, the primary scheduling information 516 and the secondary scheduling information 518 may indicate a total data volume of 1000 bytes for transmitting.

After transmitting the scheduling requests, the transmitting PDCP entity 504 may receive uplink scheduling grants from the receiving PDCP entity 502 based in part on the scheduling requests. For example, the receiving PDCP entity 502 may transmit a primary leg grant 520 that is received at the transmitting PDCP entity 504 for transmitting packets via the primary RLC leg 510. The receiving PDCP entity 502 may also transmit a secondary leg grant 522 that is received at the transmitting PDCP entity 504 for transmitting packets via the secondary RLC leg 512. The primary leg grant 520 and the secondary leg grant 522 may allocate a volume of data to the transmitting PDCP entity 504 to transmit via the respective RLC leg. For example, the transmitting PDCP entity 504 may receive a grant via the primary leg grant 520 to transmit 500 bytes via the primary RLC leg 510. The transmitting PDCP entity 504 may also receive a grant via the secondary leg grant 522 to transmit 300 bytes via the secondary RLC leg 512.

In examples in which the transmitting PDCP entity 504 is part of a base station, the scheduling information may include downlink scheduling information. For example, the primary scheduling information 516 may include downlink scheduling information scheduling packets for transmitting to the transmitting PDCP entity 504 via the primary RLC leg 510. The secondary scheduling information 518 may include downlink scheduling information scheduling packets for transmitting to the transmitting PDCP entity 504 via the secondary RLC leg 512. In the illustrated example of FIG. 5, the primary scheduling information 516 may indicate a resource allocation of 500 bytes via the primary RLC leg 510, and the secondary scheduling information 518 may indicate a resource allocation of 300 bytes via the secondary RLC leg 512.

The transmitting PDCP entity 504 may then transmit packets that are received by the receiving PDCP entity 502 via a primary leg transmission 524 and a secondary leg transmission 526. The transmitting PDCP entity 504 may transmit the primary leg transmission 524 to the receiving PDCP entity 502 via the primary RLC leg 510. The transmitting PDCP entity 504 may transmit the secondary leg transmission 526 to the receiving PDCP entity 502 via the secondary RLC leg 512. The packets transmitted via the primary leg transmission 524 and the secondary leg transmission 526 may be based in part on the primary scheduling information 516 and the secondary scheduling information 518. For example, the transmitting PDCP entity 504 may transmit a subset of the PDUs based on the data volume indicated in a grant scheduling an uplink transmission or based on the resource allocation indicated in downlink scheduling information.

In the illustrated example of FIG. 5, time T1 of the table 590 indicates a status of the transmitting PDCP entity 504 after processing the primary scheduling information 516 and the secondary scheduling information 518. For example, the transmitting PDCP entity 504 may transmit 500 bytes (e.g., five packets) to the receiving PDCP entity 502 via the primary leg transmission 524. Additionally, the transmitting PDCP entity 504 may transmit 300 bytes (e.g., three packets) to the receiving PDCP entity 502 via the secondary leg transmission 526. In the table 590, the PDCP count and the RLC sequence number (SN) for both RLC legs start with zero. Thus, as shown in the example of FIG. 5, the transmitting PDCP entity 504 transmits packets 0, 1, 2, 3, and 4 via the primary leg transmission 524, as indicated by the entry of the primary leg transmission window column 596 corresponding to the time T1. The transmitting PDCP entity 504 transmits packets 5, 6, and 7 via the secondary leg transmission 526, as indicated by the entry of the secondary leg transmission window column 598 corresponding to the time T1. Additionally, with the eight packets transmitted via the primary leg transmission 524 and the secondary leg transmission 526, the PDCP data volume at time T1 is 200 bytes (e.g., 1000 bytes–500 bytes–300 bytes=200 bytes).

As shown in FIG. 5, the transmitting PDCP entity 504 transmits another transmission 530 that is received by the receiving PDCP entity 502. The transmitting PDCP entity 504 may transmit the transmission 530 to transmit the remaining data of the PDUs (e.g., the remaining 200 bytes). The transmitting PDCP entity 504 may transmit the transmission 530 via the primary RLC leg 510 or the secondary RLC leg 512. In the illustrated example of FIG. 5, the transmitting PDCP entity 504 transmits the transmission 530 via the primary RLC leg 510.

As described above, the transmitting PDCP entity 504 may be part of a UE or a base station. In examples in which the transmitting PDCP entity 504 is part of a UE, the transmitting PDCP entity 504 may receive a grant 528 allocating resources for the transmitting PDCP entity 504 to use to transmit the transmission 530. As shown in FIG. 5, the grant 528 may allocate 500 bytes to the transmitting PDCP entity 504 to use to transmit the transmission 530 via the primary RLC leg 510. In other examples in which the transmitting PDCP entity 504 is part of a base station, the transmitting PDCP entity 504 may transmit downlink scheduling information to the receiving PDCP entity 502 scheduling a resource allocation for the transmission 530.

Although the example of FIG. 5 illustrates the transmitting PDCP entity 504 transmitting the remaining data via the primary RLC leg 510, in other examples, the transmitting PDCP entity 504 may transmit the remaining data via the secondary RLC leg 512 and/or a combination of the primary RLC leg 510 and the secondary RLC leg 512.

Time T2 of the table 590 indicates a status of the transmitting PDCP entity 504 after transmitting the remaining data (e.g., the remaining 200 bytes). For example, the transmitting PDCP entity 504 may transmit the two remaining packets of the ten packets associated with the PDUs via the transmission 530. As indicated by the entry of the primary leg transmission window column 596 corresponding to the time T2, the transmitting PDCP entity 504 transmits the packets 8 and 9 via the primary RLC leg 510. Additionally, the PDCP data volume at the time T2 is 0 bytes (e.g., 200 bytes−200 bytes=0 bytes).

In the illustrated example of FIG. 5, the receiving PDCP entity 502 transmits a primary RLC status report 532 that is received by the transmitting PDCP entity 504. The primary RLC status report 532 indicates a status of the packets transmitted by the transmitting PDCP entity 504 via the primary RLC leg 510. For example, the primary RLC status report 532 may indicate that zero or more of the packets transmitted via the primary RLC leg 510 were received (e.g., via an ACK) or not received (e.g., via a NACK). In some examples, the primary RLC status report 532 may include a bitmap in which each bit of the bitmap corresponds to a packet and a value of the bit indicates whether the packet was received or not received. For example, the primary RLC status report 532 includes a bitmap 533 of seven bits corresponding to the packets 0, 1, 2, 3, 4, 8, and 9, respectively. Additionally, in the example of FIG. 5, each bit of the bitmap 533 is set to a value (e.g., a "1") to indicate that transmission of the respective packet was successful at the receiving PDCP entity 502.

In the example of FIG. 5, the receiving PDCP entity 502 also transmits a secondary RLC status report 534 that is received by the transmitting PDCP entity 504. The secondary RLC status report 534 indicates a status of the packets transmitted by the transmitting PDCP entity 504 via the secondary RLC leg 512. For example, the secondary RLC status report 534 includes a bitmap 535 of three bits corresponding to the packets 5, 6, and 7, respectively. Additionally, in the example of FIG. 5, each bit of the bitmap 535 is set to a value (e.g., a "0") to indicate that transmission of the respective packet was unsuccessful (e.g., not received by the receiving PDCP entity 502). In some examples, differences in successfulness of the packet transmissions between the primary RLC leg 510 and the secondary RLC leg 512 may be due to different respective channel conditions. For example, the primary RLC leg 510 and the secondary RLC leg 512 may be associated with different block error rates (BLER) that contribute to one or more of the packets being successfully received or unsuccessfully received at the receiving PDCP entity 502 via the respective RLC leg.

Although the example of FIG. 5 illustrates the transmitting PDCP entity 504 receiving the primary RLC status report 532 and the secondary RLC status report 534, in other examples, the transmitting PDCP entity 504 may receive one of the primary RLC status report 532 and the secondary RLC status report 534, or may receive neither the primary RLC status report 532 nor the secondary RLC status report 534. In such examples, the transmitting PDCP entity 504 may determine the successfulness of the transmissions based on the RLC status reports received or not received. Additionally, or alternatively, the primary RLC status report 532 and the secondary RLC status report 534 may be combined in a single RLC status report and/or the bitmap 533 and the bitmap 535 may be combined in a single bitmap.

In the example of FIG. 5, time T3 of the table 590 indicates a status of the transmitting PDCP entity 504 after processing the primary RLC status report 532 and the secondary RLC status report 534. For example, the PDCP data volume remains 0 bytes and the PDCP count associated with the primary RLC leg 510 is reset to empty as the packets transmission via the primary RLC leg 510 was indicated as successful by the primary RLC status report 532. However, the PDCP count associated with the secondary RLC leg 512 is unchanged as the packets transmission via the secondary RLC leg 512 was indicated as unsuccessful via the secondary RLC status report 534. Additionally, based on the PDCP count of the packets, the receiving PDCP entity 502 may be aware that it has received packets 0, 1, 2, 3, 4, 8, and 9, and not received packets 5, 6, and 7. For example, the receiving PDCP entity 502 may initiate a timer 536 (e.g., which may be referred to as a "t-reordering" timer or by any other name). The timer 536 may be used by the receiving PDCP entity 502 to detect loss of PDCP packets. For example, when the timer 536 expires, the receiving PDCP entity 502 may provide the received packets to an upper network layer that may determine that certain packets are missing based on the PDCP count associated with the received packets. For example, if the timer 536 expired at time T3, the receiving PDCP entity 502 may provide the packets 0, 1, 2, 3, 4, 8, and 9 to the upper network layer, which may determine that the packets 5, 6, and 7 are missing.

In the illustrated example of FIG. 5, at 540, the transmitting PDCP entity 504 performs a PDCP recovery and any outstanding packets are considered data to be sent. For example, the transmitting PDCP entity 504 may convert all outstanding packets to retransmission data. At time T4, as shown in the example table 590, the three outstanding packets (e.g., the packets 5, 6, and 7) are converted to retransmission data, and the PDCP data volume is updated to 300 bytes corresponding to the three outstanding packets. Additionally, the PDCP count associated with the primary RLC leg 510 and the secondary RLC leg 512 are reset and set to empty, as shown in the respective entries of the primary leg transmission window column 596 and the secondary leg transmission window column 598.

After performing the PDCP recovery (e.g., at 540), the transmitting PDCP entity 504 of FIG. 5 has a PDPC data volume of 300 bytes, but the data split threshold volume 508 is set to 500 bytes. In scenarios in which the transmitting PDCP entity 504 relies on just the primary RLC leg 510 to transmit the high priority data (e.g., the packets 5, 6, and 7 in the example of FIG. 5), the timer 536 may expire before the high priority data is successfully received by the receiving PDCP entity 502. For example, channel conditions associated with the primary RLC leg 510 may have degraded after the primary leg transmission 524 and subsequent transmissions via the primary RLC leg 510 may be unsuccessful. In additional or alternate examples, the resource allocation for the transmission 546 may be low and, thus, multiple transmissions may be needed to transmit the high priority data. For example, the transmitting PDCP entity 504 may be allocated (e.g., via a grant or downlink scheduling information) 100 bytes of resources for transmissions via the primary RLC leg 510. In such scenarios, the transmitting PDCP entity 504 would need three transmissions to complete the transmission of packets 5, 6, and 7.

To reduce occurrences in which the timer 536 may expire because the transmitting PDCP entity 504 is attempting to transmit the three packets via the primary RLC leg 510, aspects disclosed herein enable the transmitting PDCP entity 504 to transmit high priority data via the primary RLC leg 510 and/or the secondary RLC leg 512 regardless of the data volume of the high priority data. For example, detecting high priority data may trigger the transmitting PDCP entity 504 to transmit scheduling information for transmitting via the primary RLC leg 510 and/or the secondary RLC leg 512. The transmitting PDCP entity 504 may transmit the scheduling information when the PDCP data is high priority data, but the PDCP data volume fails to satisfy (e.g., is less than) the data split threshold volume 508. For example, the transmitting PDCP entity 504 may transmit primary scheduling information 542 to transmit data via the primary RLC leg 510 and may transmit secondary scheduling information 544 to transmit data via the secondary RLC leg 512 even though the PDCP data volume (e.g., 300 bytes) is less than the data split threshold volume 508 (e.g., 500 bytes).

As described above, the scheduling information may include transmitting a scheduling request and receiving a grant (e.g., when the transmitting PDCP entity 504 is part of a UE) or may include transmitting downlink scheduling information (e.g., when the transmitting PDCP entity 504 is part of a base station).

In the illustrated example of FIG. 5, the transmitting PDCP entity 504 transmits a transmission 546 that is received by the receiving PDCP entity 502. The transmission 546 may include the three packets (e.g., the packets 5, 6, and 7) converted to retransmission data when the transmitting PDCP entity 504 performed the PDCP recovery (e.g., at 540). In the illustrated example of FIG. 5, the transmitting PDCP entity 504 transmits the transmission 546 via the secondary RLC leg 512. However, in other examples, the transmitting PDCP entity 504 may transmit the transmission 546 via the primary RLC leg 510 and/or the secondary RLC leg 512.

Time T5 of the table 590 indicates a status of the transmitting PDCP entity 504 after processing the primary scheduling information 542 and the secondary scheduling information 544. For example, the transmitting PDCP entity 504 may transmit the three retransmission packets (e.g., the packets 5, 6, and 7) to the receiving PDCP entity 502 via the secondary RLC leg 512. Thus, as shown in the example of FIG. 5, the transmitting PDCP entity 504 transmits packets 5, 6, and 7 via the transmission 546, as indicated by the entry of the secondary leg transmission window column 598 corresponding to the time T5. Additionally, with the three packets transmitted via the transmission 546, the PDCP data volume at time T0 is 0 bytes (e.g., 300 bytes-300 bytes=0 bytes).

In the table 590, the RLC sequence number for both RLC legs is reset to zero when the PDCP recovery is performed, but the PDCP count remains the same. Thus, the PDCP count packet "5" corresponds to the RLC sequence number "0," the PDCP count packet "6" corresponds to the RLC sequence number "1," and the PDCP count packet "7" corresponds to the RLC sequence number "2."

In the illustrated example of FIG. 5, the PDUs received for transmitting (e.g., at 514) include data for a new transmission (sometimes referred to as an "original" transmission). In some examples, the PDUs received for transmitting include control information, such as a status report, ROHC feedback, or EHC feedback. Control information may also be processed as high priority data by the transmitting PDCP entity 504. For example, if the data for transmitting is control information and the data volume of the control information fails to satisfy the data split threshold volume 508 (e.g., the data volume is less than the 500 bytes in the example of FIG. 5), then the transmitting PDCP entity 504 may transmit the primary scheduling information 516 and the secondary scheduling information 518 to facilitate transmitting the control information via the primary RLC leg 510 and/or the secondary RLC leg 512. Thus, the transmitting PDCP entity 504 may perform a best effort to transmit the control information to the receiving PDCP entity 502 while limiting delay of the transmission.

Although the example of FIG. 5 illustrates a primary RLC leg 510 and a secondary RLC leg 512, it may be appreciated that the secondary RLC leg 512 may include one or more RLC legs. For example, the receiving PDCP entity 502 and the transmitting PDCP entity 504 may include two or more secondary RLC entities. In such scenarios, the transmitting PDCP entity 504 may attempt to transmit high priority data, regardless of the volume of the high priority data, via the primary RLC leg and the one or more secondary RLC legs.

Figure 6:
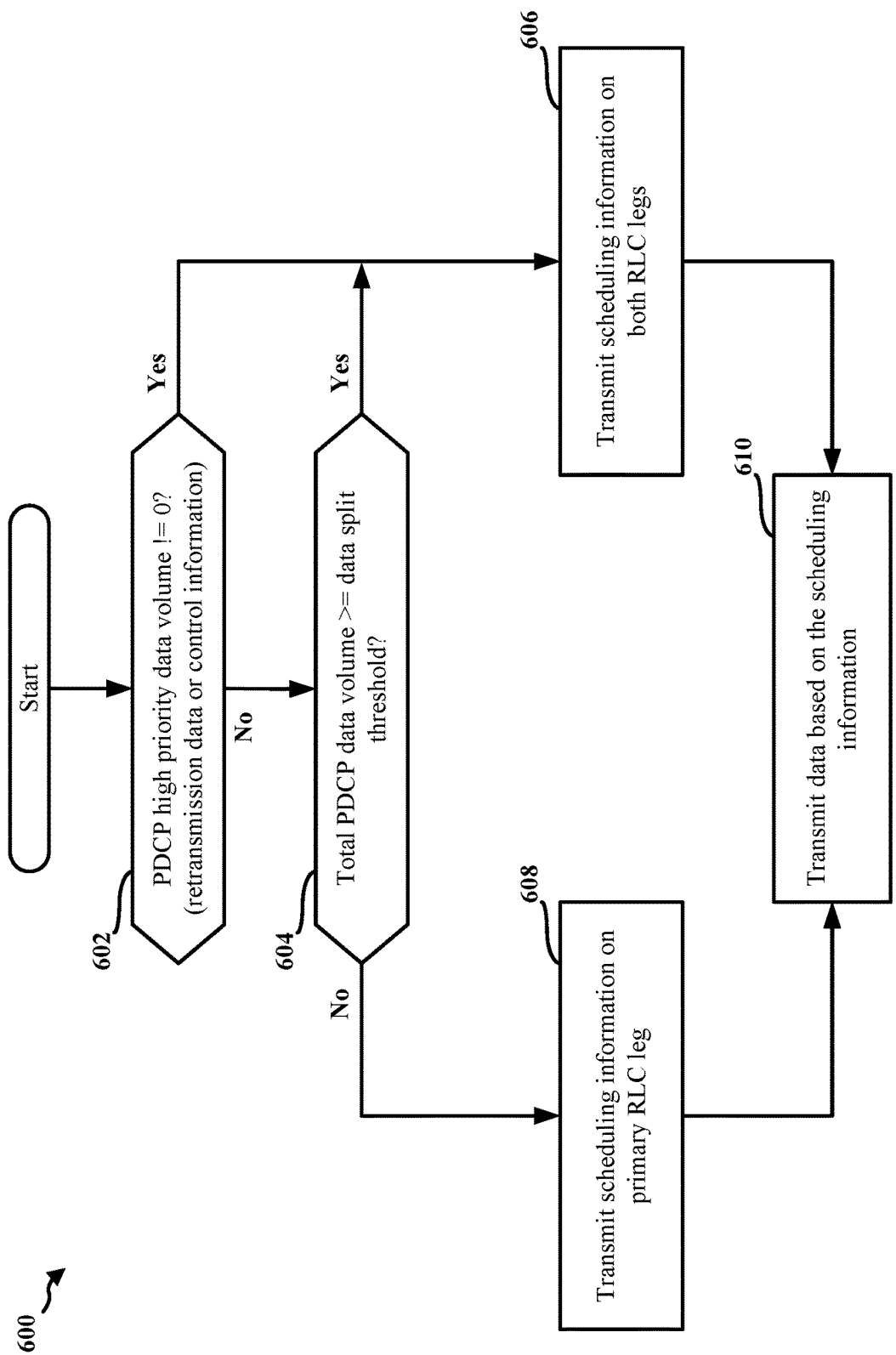
FIG. 6 is a flowchart of a method of wireless communication at a transmitting PDPC entity, in accordance with the teachings disclosed herein.

FIG. 6 is a flowchart 600 of a method of wireless communication. The method may be performed by a transmitting PDCP entity, such as the transmitting PDCP entity 504 of FIG. 5. In some examples, the transmitting PDPC entity may be part of a UE. In other examples, the transmitting PDPC entity may be part of a base station. The method may facilitate improving reliability of data transmissions by enabling the transmitting PDCP entity to attempt to transmit high priority data via the primary RLC leg and the one or more secondary RLC legs, regardless of the volume of the high priority data.

At 602, the transmitting PDCP entity determines whether there is high priority data to transmit. For example, the transmitting PDCP entity may determine if there is retransmission data to transmit or if there is control information to transmit. In some examples, the transmitting PDCP entity may convert outstanding packets to retransmission data, as described in connection with 540 of FIG. 5. In some examples, the transmitting PDCP entity may receive PDUs including control information, such as a status report, ROHC feedback, and/or EHC feedback, as described in connection with 514 of FIG. 5.

If, at 602, the transmitting PDCP entity determines that there is high priority data to transmit, then, at 606, the transmitting PDCP entity transmits scheduling information on both RLC legs, as described in connection with the primary scheduling information 516 and the secondary scheduling information 518, and/or the primary scheduling information 542 and the secondary scheduling information 544 of FIG. 5. The scheduling information may include transmitting a scheduling request (e.g., when the transmitting PDCP entity is part of a UE) or may include transmitting downlink scheduling information (e.g., when the transmitting PDCP entity is part of a base station).

After transmitting the scheduling information on both RLC legs (e.g., at 606), the transmitting PDCP entity may transmit, at 610, the data based on the scheduling information. For example, the transmitting PDCP entity may transmit the data based on an allocation of resources received in an uplink scheduling grant or an allocation of resources indicated by downlink scheduling information, as described in connection with the primary leg transmission 524, the secondary leg transmission 526, the transmission 530, and/or the transmission 546 of FIG. 5.

If, at 602, the transmitting PDCP entity determines that there is not high priority data to transmit, then, at 604, the transmitting PDCP entity determines whether the total PDCP data volume satisfies a data split threshold volume. For example, the transmitting PDCP entity may determine whether the total PDCP data volume is greater than or equal to the data split threshold volume.

If, at 604, the transmitting PDCP entity determines that the total PDCP data volume satisfies the data split threshold volume, then control proceeds to 606 and the transmitting PDCP entity transmits scheduling information on both RLC legs, as described in connection with the primary scheduling information 516 and the secondary scheduling information 518, and/or the primary scheduling information 542 and the secondary scheduling information 544 of FIG. 5. The scheduling information may include transmitting a scheduling request (e.g., when the transmitting PDCP entity is part of a UE) or may include transmitting downlink scheduling information (e.g., when the transmitting PDCP entity is part of a base station).

If, at 604, the transmitting PDCP entity determines that the total PDCP data volume does not satisfy the data split threshold volume (e.g., the total PDCP data volume is less than the data split threshold volume), then, at 608, the transmitting PDCP entity transmits scheduling information on the primary RLC leg, as described in connection with the primary scheduling information 516 and/or the primary scheduling information 542.

After transmitting the scheduling information on the primary RLC leg (e.g., at 608), the transmitting PDCP entity may transmit, at 610, the data based on the scheduling information. For example, the transmitting PDCP entity may transmit the data based on an allocation of resources received in an uplink scheduling grant or an allocation of resources indicated by downlink scheduling information, as described in connection with the primary leg transmission 524 and/or the transmission 530 of FIG. 5.

Figure 7:
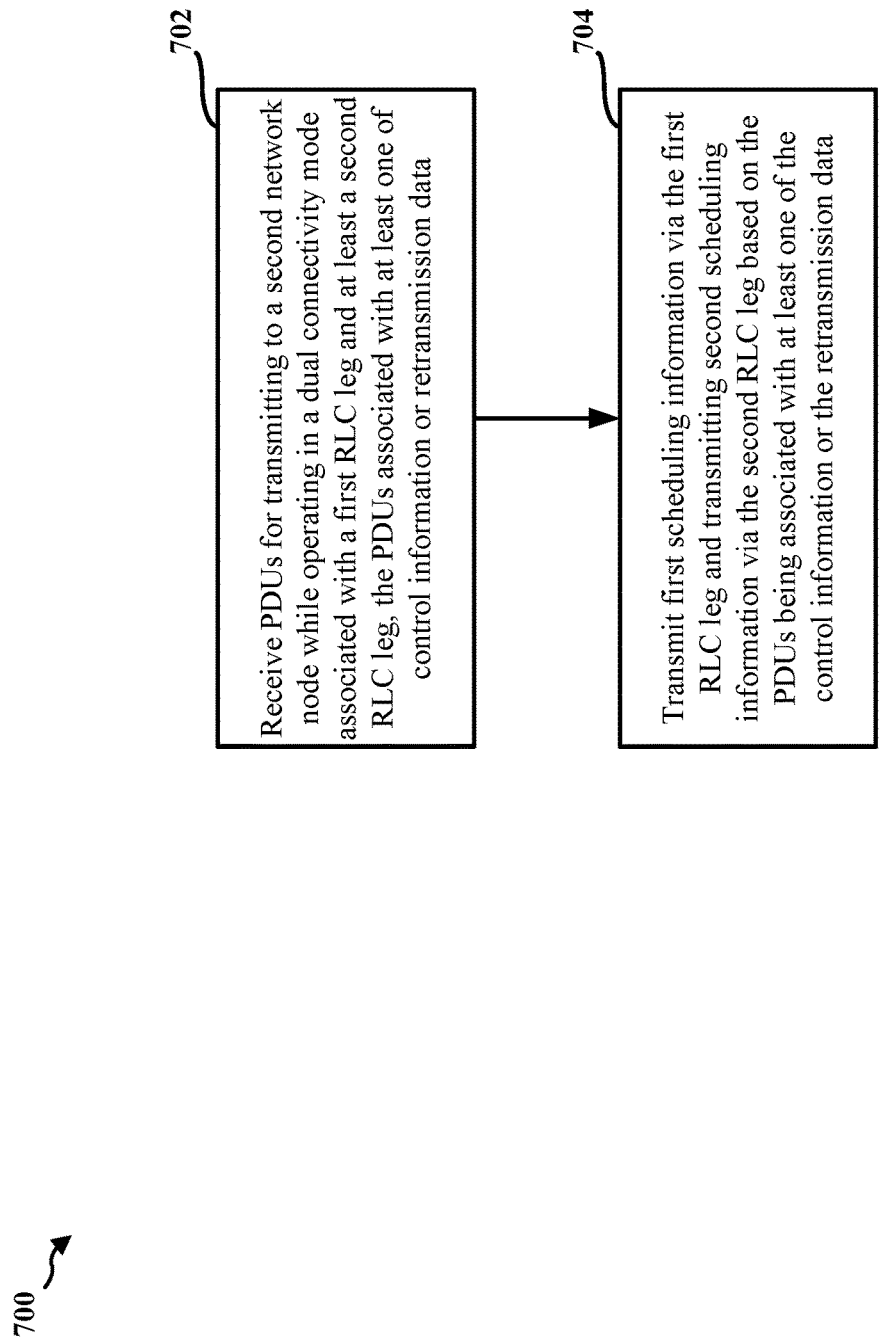
FIG. 7 is a flowchart of a method of wireless communication at a first network node, in accordance with the teachings disclosed herein.

FIG. 7 is a flowchart 700 of a method of wireless communication. The method may be performed by a first network node, such as the transmitting PDCP entity 504 of FIG. 5. In some examples, the first network node may be part of a UE (e.g., the UE 104, the UE 350, and/or an apparatus 802 of FIG. 8). In other examples, the first network node may be part of a base station (e.g., the base station 102/180, the base station 310, and/or an apparatus 902 of FIG. 9). The method may facilitate improving reliability of data transmissions by enabling the first network node to attempt to transmit high priority data via the primary RLC leg and the one or more secondary RLC legs, regardless of the volume of the high priority data.

At 702, the first network node receives PDUs for transmitting to a second network node while operating in a dual connectivity mode associated with a first RLC leg and at least a second RLC leg, as described in connection with 514 of FIG. 5. The PDUs may be associated with at least one of control information or retransmission data. The receiving of the PDUs for transmitting, at 702, may be performed by a packets component 840 of the apparatus 802 of FIG. 8 and/or a packets component 940 of the apparatus 902 of FIG. 9.

At 704, the first network node transmits first scheduling information via the first RLC leg and transmits second scheduling information via the second RLC leg based on the PDUs being associated with at least one of the control information or the retransmission data, as described in connection with the primary scheduling information 516, the secondary scheduling information 518, the primary scheduling information 542, and/or the secondary scheduling information 544 of FIG. The transmitting of the first scheduling information and the second scheduling information, at 704, may be performed by a scheduling information component 842 of the apparatus 802 of FIG. 8 and/or a scheduling information component 942 of the apparatus 902 of FIG. 9.

In some examples, the first network node may transmit the first scheduling information via the first RLC leg and transmitting the second scheduling information via the second RLC leg in response to the PDUs including the control information. For example, the control information may include a status report, ROHC feedback, or EHC feedback.

In some examples, the first network node may transmit the first scheduling information via the first RLC leg and transmitting the second scheduling information via the second RLC leg in response to the PDUs including the retransmission data, as described in connection with the PDCP data at time T4 of FIG. 5.

In some examples, the first network node may be part of a user equipment, and the second network node may be part of a base station. In such examples, the first scheduling information may include a first scheduling request and the second scheduling information may include a second scheduling request. The first network node may receive a grant scheduling a transmission via at least one of the first RLC leg and the second RLC leg, as described in connection with the primary leg grant 520, the secondary leg grant 522, the grant 528, and/or the secondary scheduling information 544 of FIG. 5. The first network node may then transmit the PDUs on at least one of the first RLC leg and the second RLC leg based on the grant, as described in connection with the primary leg transmission 524, the secondary leg transmission 526, the transmission 530, and/or the transmission 546.

In some examples, the first network node (e.g., a UE) may transmit the first scheduling request via the first RLC leg when a data volume of the PDUs fails to satisfy a threshold volume (e.g., the data split threshold volume 508), as described in connection with the primary scheduling information 542 and the PDCP data volume at time T4 of FIG. 5 and/or at 606 of FIG. 6. The example first network node (e.g., a UE) may also transmit the second scheduling request via the second RLC leg when the data volume of the PDUs fails to satisfy the threshold volume, as described in connection with the secondary scheduling information 544 and the PDCP data volume at time T4 of FIG. 5 and/or at 606 of FIG. 6

In some examples, the first network node may be part of a base station, and the second network node may be part of a UE. In such examples, the first scheduling information may include first downlink scheduling information, and the second scheduling information may include second downlink scheduling information.

In some examples, the first network node (e.g., a base station) may transmit the first scheduling request via the first RLC leg when a data volume of the PDUs fails to satisfy a threshold volume, as described in connection with the primary scheduling information 542 and the PDCP data volume at time T4 of FIG. 5 and/or at 606 of FIG. 6. The example first network node (e.g., a base station) may also transmit the second scheduling request via the second RLC leg when the data volume of the PDUs fails to satisfy the threshold volume, as described in connection with the secondary scheduling information 544 and the PDCP data volume at time T4 of FIG. 5 and/or at 606 of FIG. 6

Figure 8:
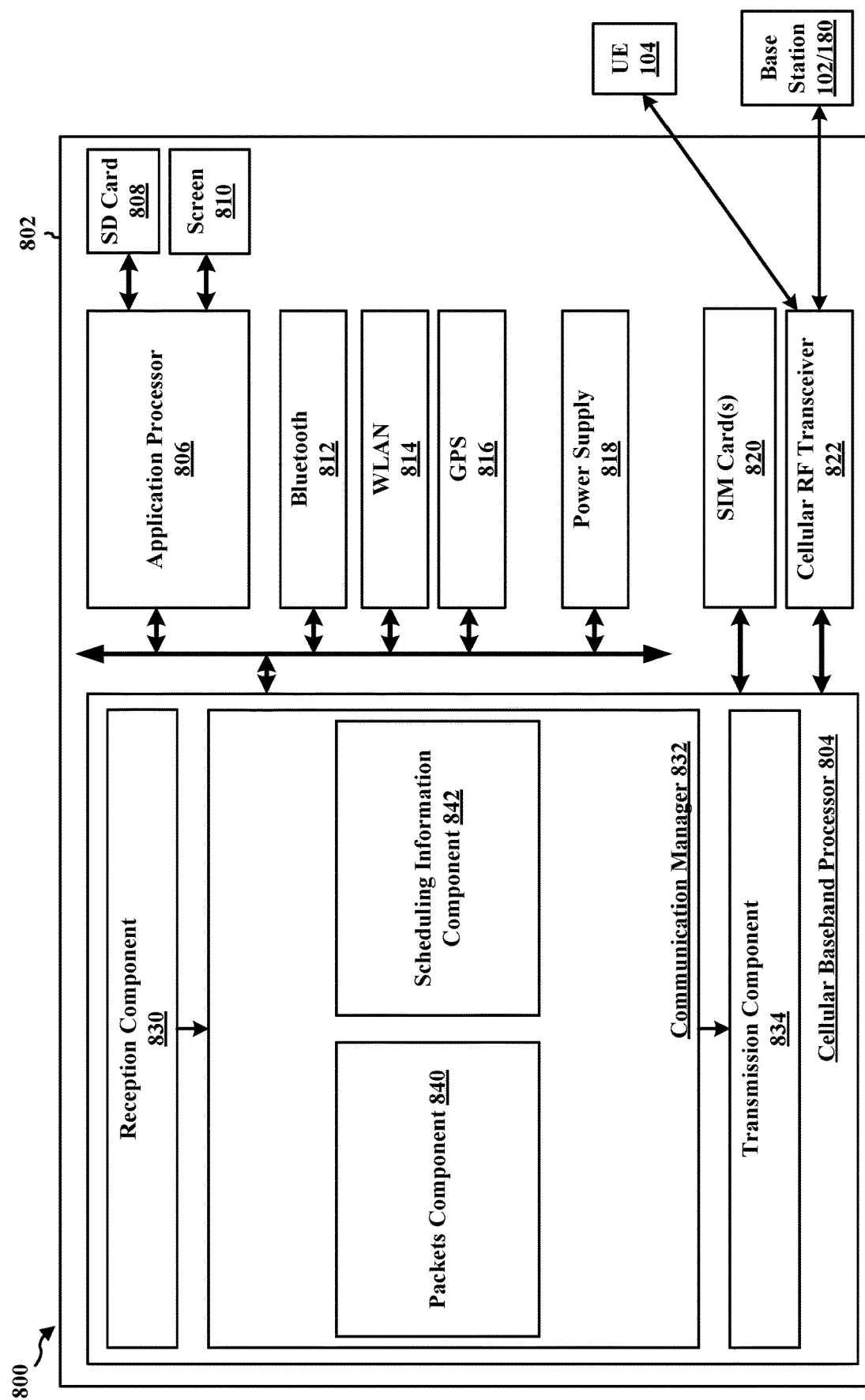
FIG. 8 is a diagram illustrating an example of a hardware implementation for an example apparatus, in accordance with the teachings disclosed herein.

FIG. 8 is a diagram 800 illustrating an example of a hardware implementation for an apparatus 802. The apparatus 802 may be a UE, a component of a UE, or may implement UE functionality. In some aspects, the apparatus 802 may include a cellular baseband processor 804 (also referred to as a modem) coupled to a cellular RF transceiver 822. In some aspects, the apparatus 802 may further include one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, or a power supply 818. The cellular baseband processor 804 communicates through the cellular RF transceiver 822 with the UE 104 and/or base station 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the cellular baseband processor 804, and in another configuration, the apparatus 802 may be the entire UE (e.g., see the UE 350 of FIG. 3) and include the additional modules of the apparatus 802.

The communication manager 832 includes a packets component 840 that is configured to receive PDUs for transmitting to a second network node while operating in a dual connectivity mode associated with a first RLC leg and at least a second RLC leg, the PDUs associated with at least one of control information or retransmission data, for example, as described in connection with 702 of FIG. 7.

The communication manager 832 also includes a scheduling information component 842 that is configured to transmit first scheduling information via the first RLC leg and transmitting second scheduling information via the second RLC leg based on the PDUs being associated with at least one of the control information or the retransmission data, for example, as described in connection with 606 of FIGS. 6 and/or 704 of FIG. 7. The example scheduling information component 842 may also be configured to transmit the first scheduling information via the first RLC leg and transmitting the second scheduling information via the second RLC leg in response to the PDUs including the control information. The example scheduling information component 842 may also be configured to transmit the first scheduling information via the first RLC leg and transmitting the second scheduling information via the second RLC leg in response to the PDUs including the retransmission data. The example scheduling information component 842 may also be configured to transmit the first scheduling request via the first RLC leg when a data volume of the PDUs fails to satisfy a threshold volume. The example scheduling information component 842 may also be configured to transmit the second scheduling request via the second RLC leg when the data volume of the PDUs fails to satisfy the threshold volume.

The example reception component 830 may also be configured to receive a grant scheduling a transmission via at least one of the first RLC leg and the second RLC leg. The example transmission component 834 may also be configured to transmit the PDUs on at least one of the first RLC leg and the second RLC leg based on the grant.

The apparatus may include additional components that perform each of the blocks of the algorithm in the flowchart of FIGS. 6 and/or 7. As such, each block in the flowcharts of FIGS. 6 and/or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 802 may include a variety of components configured for various functions. In one configuration, the apparatus 802, and in particular the cellular baseband processor 804, includes means for receiving PDUs for transmitting to a second network node while operating in a dual connectivity mode associated with a first RLC leg and at least a second RLC leg, the PDUs associated with at least one of control information or retransmission data. The example apparatus 802 also includes means for transmitting first scheduling information via the first RLC leg and transmitting second scheduling information via the second RLC leg based on the PDUs being associated with at least one of the control information or the retransmission data.

In another configuration, the example apparatus 802 also includes means for transmitting the first scheduling information via the first RLC leg and transmitting the second scheduling information via the second RLC leg in response to the PDUs including the control information.

In another configuration, the example apparatus 802 also includes means for transmitting the first scheduling information via the first RLC leg and transmitting the second scheduling information via the second RLC leg in response to the PDUs including the retransmission data.

In another configuration, the example apparatus 802 also includes means for receiving a grant scheduling a transmission via at least one of the first RLC leg and the second RLC leg. The example apparatus 802 also includes means for transmitting the PDUs on at least one of the first RLC leg and the second RLC leg based on the grant.

The means may be one or more of the components of the apparatus 802 configured to perform the functions recited by the means. As described supra, the apparatus 802 may include the TX processor 368, the RX processor 356, and the controller/processor 359. As such, in one configuration, the means may be the TX processor 368, the RX processor 356, and the controller/processor 359 configured to perform the functions recited by the means.

Figure 9:
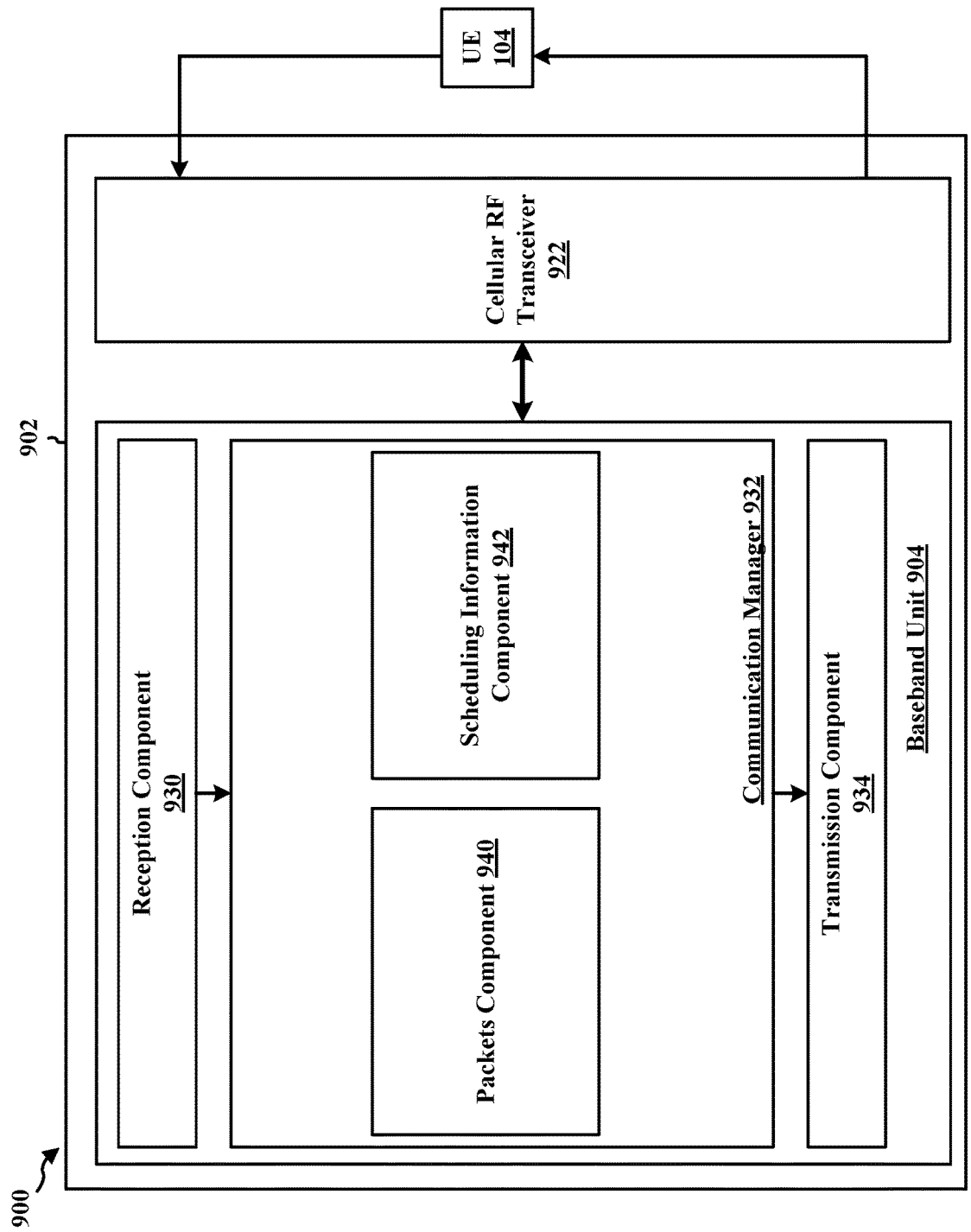
FIG. 9 is a diagram illustrating an example of a hardware implementation for an example apparatus, in accordance with the teachings disclosed herein.

FIG. 9 is a diagram 900 illustrating an example of a hardware implementation for an apparatus 902. The apparatus 902 may be a base station, a component of a base station, or may implement base station functionality. In some aspects, the apparatus 902 may include a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the base station 310 and may include the memory 376 and/or at least one of the TX processor 316, the RX processor 370, and the controller/processor 375.

The communication manager 932 includes a packets component 940 that is configured to receive PDUs for transmitting to a second network node while operating in a dual connectivity mode associated with a first RLC leg and at least a second RLC leg, the PDUs associated with at least one of control information or retransmission data, for example, as described in connection with 702 of FIG. 7.

The communication manager 932 also includes a scheduling information component 942 that is configured to transmit first scheduling information via the first RLC leg and transmitting second scheduling information via the second RLC leg based on the PDUs being associated with at least one of the control information or the retransmission data, for example, as described in connection with 606 of FIGS. 6 and/or 704 of FIG. 7. The example scheduling information component 942 may also be configured to transmit the first scheduling information via the first RLC leg and transmitting the second scheduling information via the second RLC leg in response to the PDUs including the control information. The example scheduling information component 942 may also be configured to transmit the first scheduling information via the first RLC leg and transmitting the second scheduling information via the second RLC leg in response to the PDUs including the retransmission data. The example scheduling information component 942 may also be configured to transmit the first scheduling request via the first RLC leg when a data volume of the PDUs fails to satisfy a threshold volume. The example scheduling information component 942 may also be configured to transmit the second scheduling request via the second RLC leg when the data volume of the PDUs fails to satisfy the threshold volume.

The apparatus may include additional components that perform each of the blocks of the algorithm in the flowcharts of FIGS. 6 and/or 7. As such, each block in the flowcharts of FIGS. 6 and/or 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the baseband unit 904, includes means for receiving PDUs for transmitting to a second network node while operating in a dual connectivity mode associated with a first RLC leg and at least a second RLC leg, the PDUs associated with at least one of control information or retransmission data. The example apparatus 902 also includes means for transmitting first scheduling information via the first RLC leg and transmitting second scheduling information via the second RLC leg based on the PDUs being associated with at least one of the control information or the retransmission data.

In another configuration, the example apparatus 902 also includes means for transmitting the first scheduling information via the first RLC leg and transmitting the second scheduling information via the second RLC leg in response to the PDUs including the control information.

In another configuration, the example apparatus 902 also includes means for transmitting the first scheduling information via the first RLC leg and transmitting the second scheduling information via the second RLC leg in response to the PDUs including the retransmission data.

In another configuration, the example apparatus 902 also includes means for transmitting the first downlink scheduling information via the first RLC leg when a data volume of the PDUs fails to satisfy a threshold volume. The example apparatus 902 also includes means for transmitting the second downlink scheduling information via the second RLC leg when the data volume of the PDUs fails to satisfy the threshold volume.

The means may be one or more of the components of the apparatus 902 configured to perform the functions recited by the means. As described supra, the apparatus 902 may include the TX processor 316, the RX processor 370, and the controller/processor 375. As such, in one configuration, the means may be the TX processor 316, the RX processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a first network node, comprising: receiving PDUs for transmitting to a second network node while operating in a dual connectivity mode associated with a first RLC leg and at least a second RLC leg, the PDUs associated with at least one of control information or retransmission data; and transmitting first scheduling information via the first RLC leg and transmitting second scheduling information via the second RLC leg based on the PDUs being associated with at least one of the control information or the retransmission data.

Aspect 2 is the method of aspect 1, further including: transmitting the first scheduling information via the first RLC leg and transmitting the second scheduling information via the second RLC leg in response to the PDUs including the control information.

Aspect 3 is the method of any of aspects 1 and 2, further including: transmitting the first scheduling information via the first RLC leg and transmitting the second scheduling information via the second RLC leg in response to the PDUs including the retransmission data.

Aspect 4 is the method of any of aspects 1 to 3, further including that the first network node includes a user equipment, the second network node includes a base station, the first scheduling information includes a first scheduling request, and the second scheduling information includes a second scheduling request.

Aspect 5 is the method of any of aspects 1 to 4, further including: receiving a grant scheduling a transmission via at least one of the first RLC leg and the second RLC leg; and transmitting the PDUs on at least one of the first RLC leg and the second RLC leg based on the grant.

Aspect 6 is the method of any of aspects 1 to 5, further including that the first network node transmits the second scheduling request via the second RLC leg independent of a threshold volume.

Aspect 7 is the method of any of aspects 1 to 3, further including that the first network node includes a base station, the second network node includes a user equipment, the first scheduling information includes first downlink scheduling information, and the second scheduling information includes second downlink scheduling information.

Aspect 8 is the method of any of aspects 1 and 7, further including that the first network node transmits the second downlink scheduling information via the second RLC leg independent of a threshold volume.

Aspect 9 is the method of any of aspects 1 to 8, further including that the control information includes a status report, a ROHC feedback, or an EHC feedback.

Aspect 10 is an apparatus for wireless communication comprising at least one processor coupled to a memory and configured to implement any of aspects 1 to 9.

Aspect 11 is an apparatus for wireless communication including means for implementing any of aspects 1 to 9.

Aspect 12 is a non-transitory computer-readable storage medium storing computer executable code, where the code, when executed, causes a processor to implement any of aspects 1 to 9.

What is claimed is:

1. An apparatus for wireless communication at a first network node, comprising:
    a memory; and
    at least one processor coupled to the memory and configured to:
        receive protocol data units (PDUs) for transmitting to a second network node while operating in a dual connectivity mode associated with a first radio link control (RLC) leg and at least a second RLC leg, the PDUs associated with at least one of control information or retransmission data; and
        transmit, independent of a volume of data for transmitting to the second network node exceeding a threshold volume, both first scheduling information via the first RLC leg and second scheduling information via the second RLC leg based on the PDUs being associated with at least one of the control information or the retransmission data.

2. The apparatus of claim 1, wherein the at least one processor is further configured to:
    transmit the first scheduling information via the first RLC leg and transmitting the second scheduling information via the second RLC leg in response to the PDUs including the control information.

3. The apparatus of claim 1, wherein the at least one processor is further configured to:
    transmit the first scheduling information via the first RLC leg and transmitting the second scheduling information via the second RLC leg in response to the PDUs including the retransmission data.

4. The apparatus of claim 1, wherein the first network node includes a user equipment, the second network node includes a base station, the first scheduling information includes a first scheduling request, and the second scheduling information includes a second scheduling request.

5. The apparatus of claim 4, wherein the at least one processor is further configured to:
    receive a grant scheduling a transmission via at least one of the first RLC leg and the second RLC leg; and
    transmit the PDUs on at least one of the first RLC leg and the second RLC leg based on the grant.

6. The apparatus of claim 1, wherein the first network node includes a base station, the second network node includes a user equipment, the first scheduling information includes first downlink scheduling information, and the second scheduling information includes second downlink scheduling information.

7. The apparatus of claim 6, wherein the at least one processor is further configured to:

transmit the second downlink scheduling information via the second RLC leg, wherein the volume of data for transmitting to the second network node is less than the threshold volume.

8. The apparatus of claim 1, wherein the control information includes a status report, a robust header compression (ROHC) feedback, or an Ethernet header compression (EHC) feedback.

9. The apparatus of claim 1, further comprising a transceiver coupled to the at least one processor.

10. A method of wireless communication at a first network node, comprising:
   receiving protocol data units (PDUs) for transmitting to a second network node while operating in a dual connectivity mode associated with a first radio link control (RLC) leg and at least a second RLC leg, the PDUs associated with at least one of control information or retransmission data; and
   transmitting, independent of a volume of data for transmitting to the second network node exceeding a threshold volume, both first scheduling information via the first RLC leg and second scheduling information via the second RLC leg based on the PDUs being associated with at least one of the control information or the retransmission data.

11. The method of claim 10, further comprising:
   transmitting the first scheduling information via the first RLC leg and transmitting the second scheduling information via the second RLC leg in response to the PDUs including the control information.

12. The method of claim 10, further comprising:
   transmitting the first scheduling information via the first RLC leg and transmitting the second scheduling information via the second RLC leg in response to the PDUs including the retransmission data.

13. The method of claim 10, wherein the first network node includes a user equipment, the second network node includes a base station, the first scheduling information includes a first scheduling request, and the second scheduling information includes a second scheduling request.

14. The method of claim 13, further comprising:
   receiving a grant scheduling a transmission via at least one of the first RLC leg and the second RLC leg; and
   transmitting the PDUs on at least one of the first RLC leg and the second RLC leg based on the grant.

15. The method of claim 10, wherein the first network node includes a base station, the second network node includes a user equipment, the first scheduling information includes first downlink scheduling information, and the second scheduling information includes second downlink scheduling information.

16. The method of claim 15, wherein the first network node transmits the second downlink scheduling information via the second RLC leg despite the volume of data for transmitting to the second network node that is less than the threshold volume.

17. The method of claim 10, wherein the control information includes a status report, a robust header compression (ROHC) feedback, or an Ethernet header compression (EHC) feedback.

18. A non-transitory computer-readable medium storing computer executable code at a first network node, the code when executed by at least one processor causes the at least one processor to:
   receive protocol data units (PDUs) for transmitting to a second network node while operating in a dual connectivity mode associated with a first radio link control (RLC) leg and at least a second RLC leg, the PDUs associated with at least one of control information or retransmission data; and
   transmit, independent of a volume of data for transmitting to the second network node exceeding a threshold volume, both first scheduling information via the first RLC leg and second scheduling information via the second RLC leg based on the PDUs being associated with at least one of the control information or the retransmission data.

19. The non-transitory computer-readable medium of claim 18, wherein the code when executed by the at least one processor further causes the at least one processor to:
   transmit the first scheduling information via the first RLC leg and transmitting the second scheduling information via the second RLC leg in response to the PDUs including the control information.

20. The non-transitory computer-readable medium of claim 18, wherein the code when executed by the at least one processor further causes the at least one processor to:
   transmit the first scheduling information via the first RLC leg and transmitting the second scheduling information via the second RLC leg in response to the PDUs including the retransmission data.

* * * * *